United States Patent
Kubota

(10) Patent No.: US 11,495,404 B2
(45) Date of Patent: Nov. 8, 2022

(54) MULTILAYER CERAMIC ELECTRONIC COMPONENT

(71) Applicant: Murata Manufacturing Co., Ltd., Nagaokakyo (JP)

(72) Inventor: Sho Kubota, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 210 days.

(21) Appl. No.: 16/993,313

(22) Filed: Aug. 14, 2020

(65) Prior Publication Data

US 2021/0074476 A1  Mar. 11, 2021

(30) Foreign Application Priority Data

Sep. 9, 2019 (JP) .............................. JP2019-163862

(51) Int. Cl.
   *H01G 4/008* (2006.01)
   *H01G 4/012* (2006.01)
   *H01G 4/232* (2006.01)
   *H01G 4/12* (2006.01)

(52) U.S. Cl.
   CPC ........... *H01G 4/012* (2013.01); *H01G 4/0085* (2013.01); *H01G 4/2325* (2013.01); *H01G 4/1227* (2013.01); *H01G 4/1236* (2013.01)

(58) Field of Classification Search
   CPC .... H01G 4/0085; H01G 4/012; H01G 4/1227; H01G 4/1236; H01G 4/2325; H01G 4/008; H01G 4/232; H01G 4/005; H01G 4/1218; H01G 4/224; H01G 4/228; H01G 4/30; H01G 4/385; H01G 4/38; H05K 1/11; H05K 1/181; H05K 1/18; H05K 2201/10015

USPC ......... 361/301.4, 306.3, 321.4, 321.2, 321.5; 174/260

See application file for complete search history.

(56) References Cited

U.S. PATENT DOCUMENTS

| | | | |
|---|---|---|---|
| 2010/0052838 A1 | 3/2010 | Matsuta et al. | |
| 2010/0154747 A1* | 6/2010 | Inagaki | H01L 41/257 |
| | | | 123/456 |
| 2011/0037557 A1 | 2/2011 | Konoue et al. | |

FOREIGN PATENT DOCUMENTS

| | | | | |
|---|---|---|---|---|
| CN | 103366954 A | * 10/2013 | | H01G 4/12 |
| JP | 08-306580 A | 11/1996 | | |
| JP | 2004179349 A | * 6/2004 | | H01G 4/30 |
| JP | 2004207633 A | * 7/2004 | | F02M 51/00 |
| JP | 2010-062187 A | 3/2010 | | |

(Continued)

*Primary Examiner* — Timothy J Thompson
*Assistant Examiner* — Guillermo J Egoavil
(74) *Attorney, Agent, or Firm* — Keating & Bennett, LLP

(57) ABSTRACT

A multilayer ceramic electronic component includes an internal electrode layer including, on a same ceramic layer, a peripheral internal electrode having a frame shape and an inside internal electrode located inside the peripheral internal electrode. A metallic species included in the peripheral internal electrode is different from a metallic species included in the inside internal electrode. The metallic species included in the peripheral internal electrode includes more than or equal to about 50% of a metallic species different from the metallic species included in the inside internal electrode. In a width direction, a dimension a of a width of the peripheral internal electrode is about 5 µm<a<about 30 µm, and a dimension b of a width of the inside internal electrode is b/a≥about 20.

20 Claims, 8 Drawing Sheets

(56) References Cited

FOREIGN PATENT DOCUMENTS

| | | | | |
|---|---|---|---|---|
| JP | 2015141982 A * | 8/2015 | ............... | H01G 4/12 |
| JP | 2017-204562 A | 11/2017 | | |
| WO | 2009/133766 A1 | 11/2009 | | |
| WO | WO-2012120913 A1 * | 9/2012 | ........... | H01G 4/0085 |

* cited by examiner

MULTILAYER CERAMIC ELECTRONIC COMPONENT

CROSS REFERENCE TO RELATED APPLICATIONS

This application claims the benefit of priority to Japanese Patent Application No. 2019-163862 filed on Sep. 9, 2019. The entire contents of this application are hereby incorporated herein by reference.

BACKGROUND OF THE INVENTION

1. Field of the Invention

The present invention relates to multilayer ceramic electronic components.

2. Description of the Related Art

As shown in the assembly perspective view of FIG. 7, a multilayer ceramic electronic component typically includes a stack 52, in which internal electrode layers 56 and ceramic layers 54 are alternately stacked, and external electrodes (not shown) provided on outer surfaces of stack 52. For example, in a multilayer ceramic capacitor, ceramic layer 54 is made of a ceramic dielectric material (e.g., Japanese Patent Laid-Open No. 08-306580).

Metals of the ceramic dielectric material and internal electrode layer 56 differ in quality of material, and accordingly, less easily adhere to each other. Also, internal electrode layer 56 and ceramic layer 54 greatly differ in coefficient of thermal expansion. As a result, a distortion increases due to a difference in the contraction amount between internal electrode layer 56 and ceramic layer 54 at varying temperatures.

As shown in FIG. 8, thus, a peripheral portion of internal electrode layer 56 which is surrounded by the dotted line R in a frame shape has a high residual stress within the multilayer ceramic capacitor. When being externally applied with a stress or the like, accordingly, cracking or peeling may occur at an interface between internal electrode layer 56 and the ceramic dielectric material due to the residual stress.

SUMMARY OF THE INVENTION

Preferred embodiments of the present invention provide multilayer ceramic electronic components that are each able to reduce or prevent a residual stress inside the multilayer ceramic component and are each resistant to cracking or peeling at an interface between an internal electrode and a ceramic dielectric material.

A multilayer ceramic electronic component according to a preferred embodiment of the present invention includes a stack including a plurality of ceramic layers that are stacked and a plurality of internal electrode layers that are stacked on the ceramic layers, the stack including a first main surface and a second main surface facing each other in a stacking direction, a first end surface and a second end surface facing each other in a length direction orthogonal or substantially orthogonal to the stacking direction, and a first lateral surface and a second lateral surface facing each other in a width direction orthogonal or substantially orthogonal to the stacking direction and the length direction, each of the internal electrode layers including a first internal electrode layer exposed to the first end surface and a second internal electrode layer exposed to the second end surface; a first external electrode connected to the first internal electrode layer, disposed on the first end surface, and extending from the first end surface to cover a portion of each of the first main surface, the second main surface, the first lateral surface, and the second lateral surface; and a second external electrode connected to the second internal electrode layer, disposed on the second end surface, and extending from the second end surface to cover a portion of each of the first main surface, the second main surface, the first lateral surface, and the second lateral surface. The first internal electrode layer includes, on a same ceramic layer, a first peripheral internal electrode having a frame shape and a first inside internal electrode located inside the first peripheral internal electrode. The second internal electrode layer includes, on a same ceramic layer, a second peripheral internal electrode having a frame shape and a second inside internal electrode located inside the second peripheral internal electrode. A metallic species included in each of the first peripheral internal electrode and the second peripheral internal electrode is different from a metallic species included in each of the first inside internal electrode and the second inside internal electrode. The metallic species included in each of the first peripheral internal electrode and the second peripheral internal electrode includes more than or equal to about 50% of a metallic species different from the metallic species included in each of the first inside internal electrode and the second inside internal electrode. In a width direction connecting the first lateral surface and the second lateral surface, about 5 μm<a1 where at least one of a dimension of a width of the first peripheral internal electrode closest to the first lateral surface and a dimension of a width of the first peripheral internal electrode closest to the second lateral surface is a1, and about 5 μm<a2 where at least one of a dimension of a width of the second peripheral internal electrode closest to the first lateral surface and a dimension of a width of the second peripheral internal electrode closest to the second lateral surface is a2.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described in detail below with reference to the drawings.

1. Multilayer Ceramic Electronic Component

Figure 1:
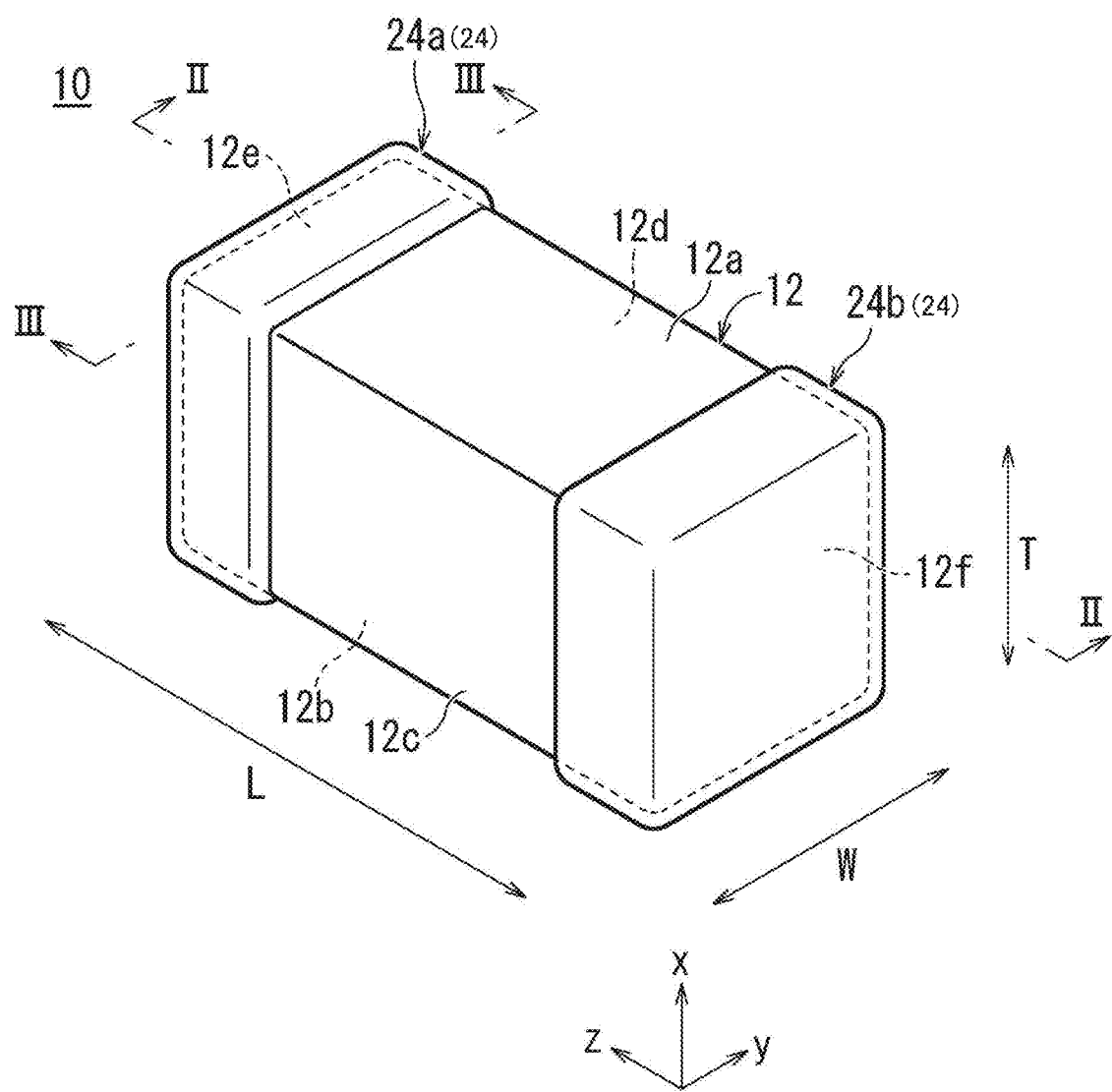
FIG. 1 is an external perspective view of a multilayer ceramic electronic component according to a preferred embodiment of the present invention.
Figure 2:
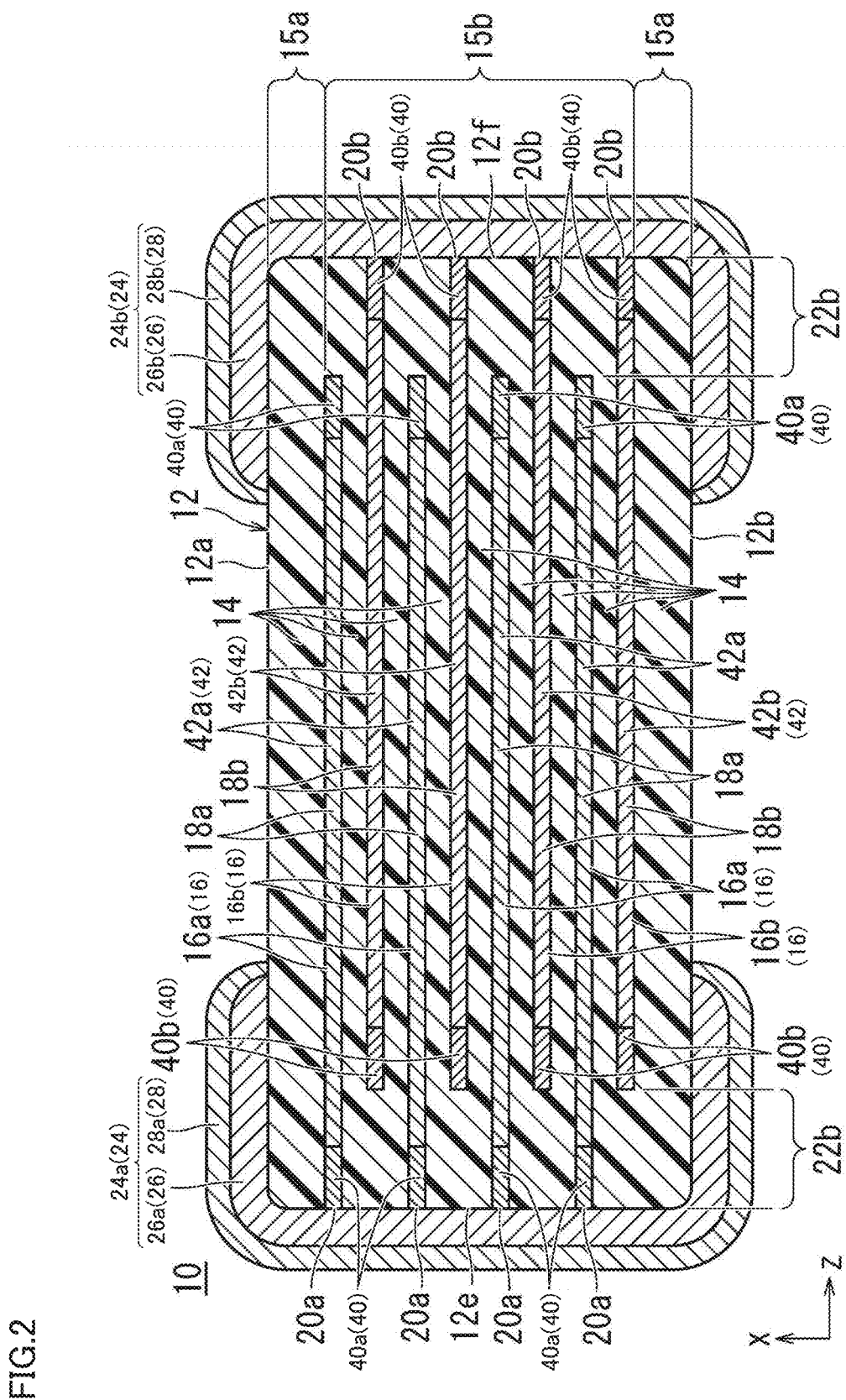
FIG. 2 is a sectional view of a multilayer ceramic electronic component according to a preferred embodiment of the present invention, taken along the line II-II of FIG. 1.
Figure 3:
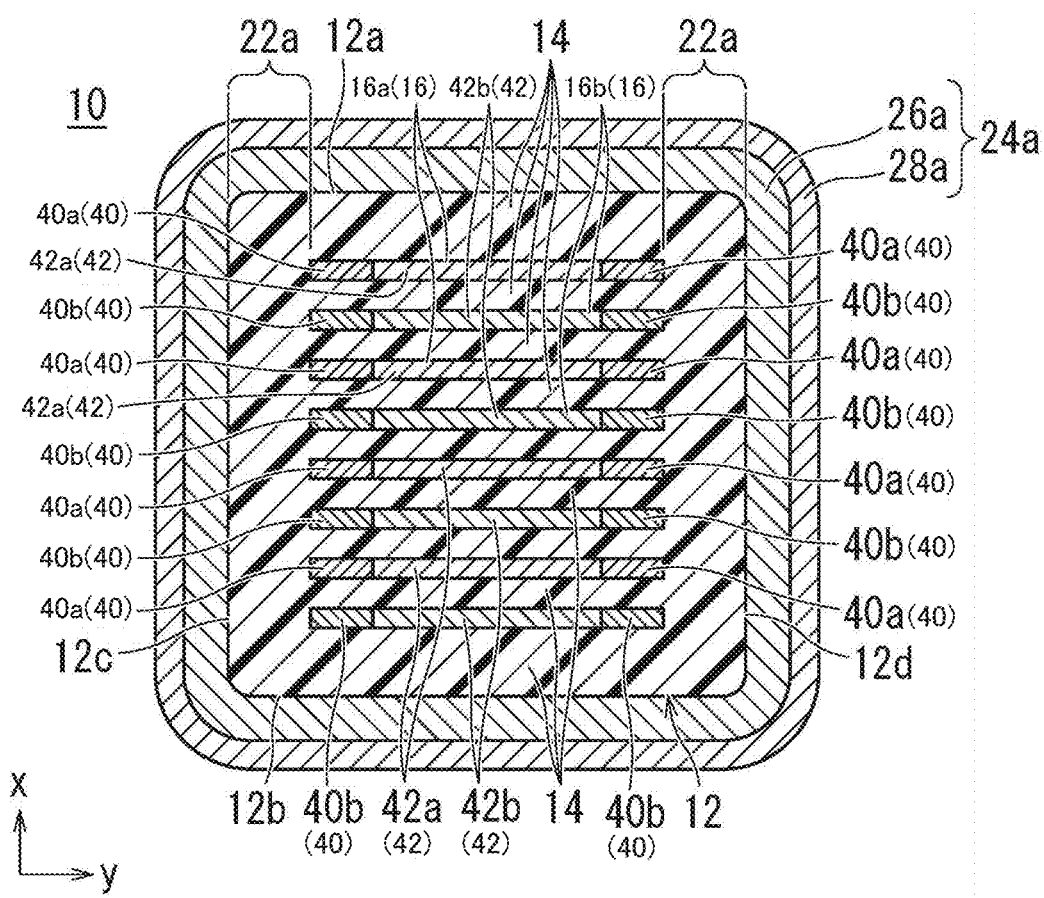
FIG. 3 is a sectional view of a multilayer ceramic electronic component according to a preferred embodiment of the present invention, taken along the line III-III of FIG. 1.
Figure 4:
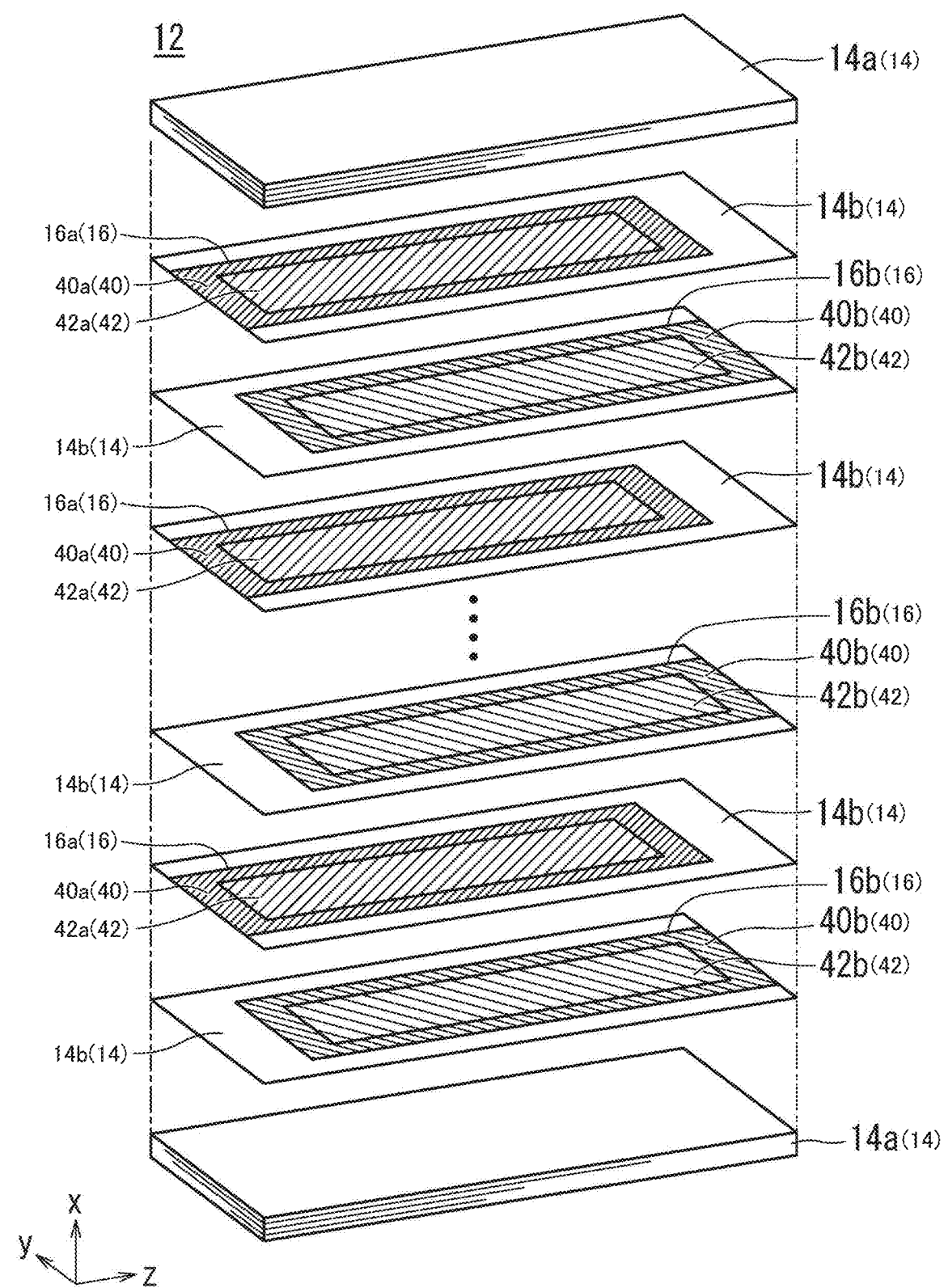
FIG. 4 is an assembly perspective view of a stack of FIG. 1.
Figure 5A:
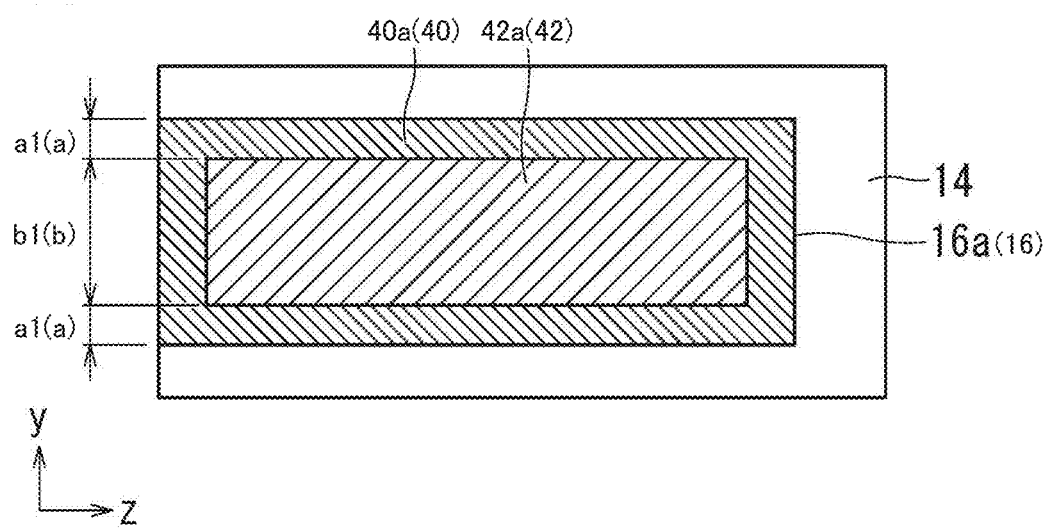
FIG. 5A is a schematic plan view showing a configuration of a first internal electrode of internal electrodes shown in FIG. 4.
Figure 5B:
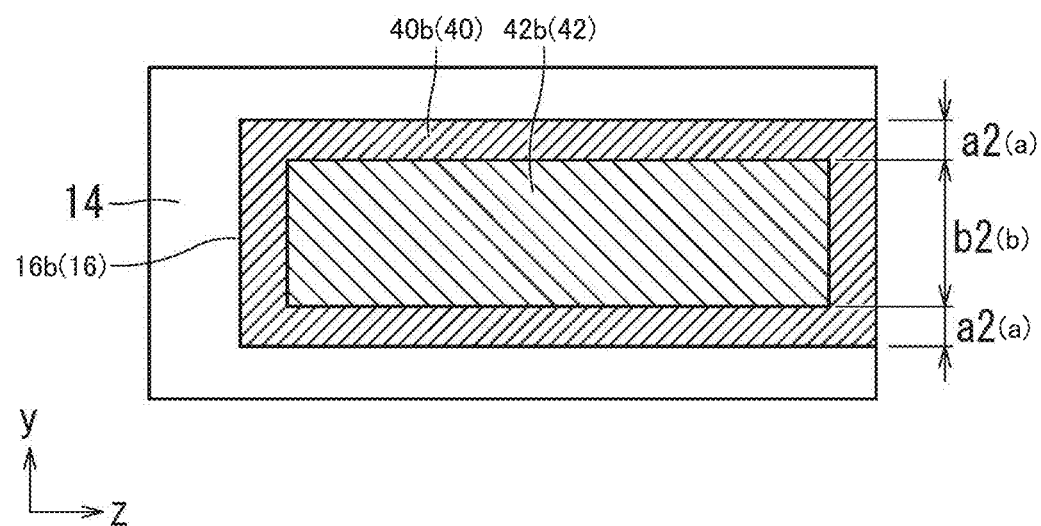
FIG. 5B is a schematic plan view showing a configuration of a second internal electrode of the internal electrodes shown in FIG. 4.

A multilayer ceramic capacitor 10 included in a multilayer ceramic electronic component according to a preferred embodiment of the present invention will be described. FIG. 1 is an external perspective view showing an example of multilayer ceramic capacitor 10 according to a preferred embodiment of the present invention. FIG. 2 is a sectional view of multilayer ceramic capacitor 10 according to the present invention, taken along the line II-II of FIG. 1. FIG. 3 is a sectional view of multilayer ceramic capacitor 10 according to a preferred embodiment of the present invention, taken along the line III-III of FIG. 1. FIG. 4 is an assembly perspective view of a stack of FIG. 1. FIGS. 5A and 5B are schematic plan views each showing a configuration of an internal electrode of the internal electrodes shown in FIG. 4. FIG. 5A is a schematic plan view showing a configuration of a first internal electrode. FIG. 5B is a schematic plan view showing a configuration of a second internal electrode.

As shown in FIGS. 1 to 3, multilayer ceramic capacitor includes a stack 12 having a rectangular or substantially rectangular parallelepiped shape and external electrodes 24 disposed at opposite ends of stack 12.

(A) Stack

As shown in FIG. 1, stack 12 has an x direction as a stacking direction, a y direction as a width direction, and a z direction as a length direction. As shown in FIGS. 2, 3, 4, 5A, and 5B, stack 12 includes a plurality of ceramic layers 14 that are stacked and a plurality of internal electrode layer 16 that are stacked, and includes a first main surface 12a and a second main surface 12b facing each other in stacking direction x, a first lateral surface 12c and a second lateral surface 12d facing each other in width direction y, and a first end surface 12e and a second end surface 12f facing each other in length direction z. Herein, stack 12 does not necessarily have a dimension in length direction z which is larger than a dimension in width direction y.

First main surface 12a and second main surface 12b of stack 12 are surfaces parallel or substantially parallel to a surface (mounting surface) on which capacitor 10 is mounted on a mounting board. In particular, second main surface 12b is a mounting surface mounted on the mounting board.

Preferably, stack 12 has a rectangular or substantially rectangular parallelepiped shape and has rounded corners and rounded ridgelines. The corner is a portion at which three surfaces of stack 12 meet together, and the ridgeline is a portion at which two surfaces of stack 12 meet together.

Although stack 12 may have any dimensions, preferably, an L dimension in length direction z is more than or equal to about 0.2 mm and less than or equal to about 5.5 mm, a W dimension in width direction y is more than or equal to about 0.1 mm and less than or equal to about 2.5 mm, and a T dimension in stacking direction x is more than or equal to about 0.1 mm and less than or equal to about 2.5 mm, for example.

(a) Ceramic Layers

Stack 12 includes an external layer portion 15a including ceramic layers 14 and an internal layer portion 15b including one or more ceramic layers 14 and internal electrode layers 16 provided on ceramic layers 14. External layer portion 15a is located at first main surface 12a and second main surface 12b of stack 12 and is an aggregation of ceramic layers 14 located between first main surface 12a and internal electrode layer 16 closest to first main surface 12a and ceramic layers 14 located between second main surface 12b and internal electrode layer 16 closest to second main surface 12b. A region sandwiched in external layer portion 15a is internal layer portion 15b.

Although any number of stacked ceramic layers 14 may be provided, preferably, an external layer portion 14a is included, and, for example, more than or equal to 10 and less than or equal to 2000 ceramic layers 14 are provided.

The ceramic material may be a dielectric ceramic mainly made of $BaTiO_3$, $CaTiO_3$, $SrTiO_3$, or $CaZrO_3$, for example. Alternatively, the ceramic material may include an accessory component such as a Mn compound, an Fe compound, a Cr compound, a Co compound, or a Ni compound, in addition to the above main components.

If ceramic layer 14 includes a piezoelectric ceramic material, the electronic component defines and functions as a piezoelectric component. A specific example of the piezoelectric ceramic material is a PZT (lead zirconate titanate) ceramic material.

If ceramic layer 14 includes a semiconductor ceramic material, the electronic component defines and functions as a thermistor. A specific example of the semiconductor ceramic material is a spinel ceramic material.

If ceramic layer 14 includes a magnetic ceramic material, the electronic component defines and functions as an inductor. When the electronic component defines and functions as an inductor, internal electrode layer 16 is a coil-shaped conductor. A specific example of the magnetic ceramic material is a ferrite ceramic material.

Ceramic layer 14 preferably has a thickness of, for example, more than or equal to about 0.5 μm and less than or equal to about 10 μm after firing.

(b) Internal Electrode Layers

Internal electrode layers 16 include a plurality of first internal electrode layers 16a and a plurality of second internal electrode layers 16b as shown in FIGS. 2, 5A, and 5B.

First internal electrode layer 16a and second internal electrode layer 16b are disposed on different ceramic layers 14.

First internal electrode layer 16a includes a first facing electrode portion 18a facing second internal electrode layer 16b and a first leading electrode portion 20a located at one end of first internal electrode layer 16a and extending from first facing electrode portion 18a to first end surface 12e of stack 12. First leading electrode portion 20a includes an end led to first end surface 12e to be exposed.

Second internal electrode layer 16b includes a second facing electrode portion 18b facing first internal electrode layer 16a and a second leading electrode portion 20b located at one end of second internal electrode layer 16b and extending from second facing electrode portion 18b to second end surface 12f of stack 12. Second leading electrode portion 20b includes an end led to second end surface 12f to be exposed.

Although each of first facing electrode portion 18a of first internal electrode layer 16a and second facing electrode portion 18b of second internal electrode layer 16b may have any shape, it preferably has a rectangular or substantially rectangular shape, for example. Each of first facing electrode portion 18a and second facing electrode portion 18b may have rounded corners or diagonally shaped (tapered) corners.

Although each of first leading electrode portion 20a of first internal electrode layer 16a and second leading electrode portion 20b of second internal electrode layer 16b may have any shape, it preferably has a rectangular or substantially rectangular shape, for example. Each of first leading electrode portion 20a and second leading electrode portion 20b may have rounded corners or diagonally shaped (tapered) corners.

First facing electrode portion 18a and first leading electrode portion 20a of first internal electrode layer 16a may have an equal or substantially equal width, or any one of these electrode portions may be narrower than the other electrode portions. Similarly, second facing electrode portion 18b and second leading electrode portion 20b of second internal electrode layer 16b may have an equal or substantially equal width, or any one of these electrode portions may be narrower than the other electrode portions.

In stack 12, first facing electrode portion 18a of first internal electrode layer 16a and second facing electrode portion 18b of second internal electrode layer 16b face each other with ceramic layer 14 therebetween, so as to generate a capacitance. Thus, a capacitance can be provided between first external electrode 24a connected with first internal electrode layer 16a and second external electrode 24b connected with second internal electrode layer 16b, so that the characteristics of a capacitor are achieved.

Stack 12 includes a lateral portion (hereinbelow, "W gap") 22a provided between first lateral surface 12c and one end of each of first facing portion 18a and second facing portion 18b in width direction y and between second lateral surface 12d and the other end of each of first facing portion 18a and second facing portion 18b in width direction y. Stack 12 further includes an end (hereinbelow, "L gap") 22b provided between second end surface 12f and the end of first internal electrode layer 16a opposite to first leading electrode portion 20a and between first end surface 12e and the end of second internal electrode layer 16b opposite to second leading electrode portion 20b.

As shown in FIGS. 4, 5A, and 5B, internal electrode layer 16 includes a peripheral internal electrode 40 having a rectangular or substantially rectangular frame shape and an inside internal electrode 42 having a rectangular or substantially rectangular shape. Peripheral internal electrodes 40 include first peripheral internal electrodes 40a and second peripheral internal electrodes 40b. Inside internal electrodes 42 include first inside internal electrodes 42a and second inside internal electrodes 42b.

First internal electrode layer 16a includes, on the same ceramic layer 14, a first peripheral internal electrode 40a having a rectangular or substantially rectangular frame shape and a first inside internal electrode 42a have a rectangular or substantially rectangular shape located inside first peripheral internal electrode 40a. First peripheral internal electrode 40a and first inside internal electrode 42a are coplanar with first internal electrode layer 16a.

Second internal electrode layer 16b includes, on the same ceramic layer 14, a second peripheral internal electrode 40b having a rectangular or substantially rectangular frame shape and a second inside internal electrode 42b having a rectangular or substantially rectangular shape located inside second peripheral internal electrode 40b. Second peripheral internal electrode 40b and second inside internal electrode 42b are coplanar with second internal electrode layer 16b.

A metallic species included in each of first peripheral internal electrode 40a and second peripheral internal electrode 40b is different from a metallic species included in each of first inside internal electrode 42a and second inside internal electrode 42b. Thus, a difference in contraction amount during firing between internal electrode layer 16 and ceramic layer 14 is reduced by the metallic species of peripheral internal electrode 40, which can reduce a stress caused by the difference in contraction amount during firing. Consequently, a residual stress inside multilayer ceramic capacitor 10 can be reduced, which can reduce or prevent cracking or peeling at an interface between internal electrode layer 16 and ceramic layer 14.

The metallic species included in each of first peripheral internal electrode 40a and second peripheral internal electrode 40b may be made of an appropriate conductive material, for example, a metal such as Ni, Cu, Ag, Pd, or Au, or an alloy including at least one of these metals, such as a Ag—Pd alloy. In particular, Ni, for example, is preferably included.

A metallic species included in each of first inside internal electrode 42a and second inside internal electrode 42b may be made of an appropriate conductive material, for example, a metal such as Ni, Cu, Ag, Pd, or Au, or an alloy including at least one of these metals, such as a Ag—Pd alloy. In particular, Pd, for example, is preferably included.

The metallic species included in peripheral internal electrode 40 preferably includes more than or equal to about 50% of a dissimilar metallic species different from the metallic species included in inside internal electrode 42, in addition to the metallic species included in inside internal electrode 42. Accordingly, the dissimilar metallic species included in peripheral internal electrode 40 which is different from the metallic species of inside internal electrode 42 affects, to a larger degree, the contractibility of an electrode portion located in peripheral internal electrode 40. Consequently, the dissimilar metallic species different from the metallic species of inside internal electrode 42 reduces the difference in contraction amount during firing, which can reduce or prevent peeling or cracking.

If the metallic species included in peripheral internal electrode 40 includes less than about 50% of a dissimilar metallic species different from the metallic species included in inside internal electrode 42, the dissimilar metallic species different from the metallic species of inside internal electrode 42 affects, to a smaller degree, the contractibility of the electrode portion located in peripheral internal electrode 40. Consequently, the dissimilar metallic species different from the metallic species of inside internal electrode 42 fails to reduce a difference in contraction amount during firing, which may cause peeling or cracking.

Further, as shown in FIG. 5A, in width direction y connecting first lateral surface 12c and second lateral surface 12d, about 5 μm<a1 where at least one of a dimension of a width of first peripheral internal electrode 40a closest to first lateral surface 12c and a dimension of a width of first peripheral internal electrode 40a closest to second lateral surface 12d is a1.

As shown in FIG. 5B, in width direction y connecting first lateral surface 12c and second lateral surface 12d, about 5 μm<a2 where at least one of a dimension of a width of second peripheral internal electrode 40b closest to first lateral surface 12c and a dimension of a width of second peripheral internal electrode 40b closest to second lateral surface 12d is a2.

As a result, first internal electrode layer 16a located in first peripheral internal electrode 40a reduces a difference in contraction between first internal electrode layer 16a located in first inside internal electrode 42a and ceramic layer 14, which can reduce or prevent the occurrence of peeling or cracking. Similarly, second internal electrode layer 16b located in second peripheral internal electrode 40b reduces a difference in contraction between second inside internal electrode 42b and second internal electrode layer 16b, which can reduce or prevent the occurrence of cracking or peeling.

If a1 and a2 are smaller than about 5 μm, the regions of first internal electrode layer 16a located in first peripheral internal electrode 40a and second internal electrode layer 16b located in second peripheral internal electrode 40b decrease. Accordingly, an effect of reducing contraction may not be obtained sufficiently.

In width direction y connecting first lateral surface 12c and second lateral surface 12d, both of the dimension a1 of first peripheral internal electrode 40a closest to first lateral surface 12c and the dimension a1 of first peripheral internal electrode 40a closest to second lateral surface 12d preferably have the relationship of about 5 μm<a1 described above. Also, both of the dimension a2 of second peripheral internal electrode 40b closest to first lateral surface 12c and the dimension a2 of second peripheral internal electrode 40b closest to second lateral surface 12d preferably have the relationship of about 5 μm<a2 described above.

Further, in width direction y connecting first lateral surface 12c and second lateral surface 12d, preferably, a1<about 30 μm and b1/a1≥about 20 where a dimension of a width of first inside internal electrode 42a is b1. Similarly, preferably, a2<about 30 μm and b2/a2≥about 20 where a dimension of a width of second inside internal electrode 42b is b2.

If a1 or a2 is greater than about 30 μm, an equivalent series resistance (ESR) may change greatly due to internal electrode layers 16 located in first peripheral internal electrode 40a and second peripheral internal electrode 40b. In other words, if a1 or a2 is smaller than about 30 μm, peeling or cracking can be reduced or prevented as described above, and in addition, the ESR can be reduced.

If b1/a1 or b2/a2 is smaller than about 20, an equivalent series resistance (ESR) may change greatly due to internal electrode layers 16 located in first peripheral internal electrode 40a and second peripheral internal electrode 40b. In other words, if b1/a1 or b2/a2 is greater than about 20, peeling or cracking can be reduced or prevented as described above, and in addition, the ESR can be reduced.

Hereinbelow, dimension a1 and dimension a2 may be collectively referred to as "dimension a", and dimension b1 and dimension b2 may be collectively referred to as "dimension b".

Further, preferably, A>B>C where the coefficient of linear expansion of each of first inside internal electrode 42a and second inside internal electrode 42b is A, the coefficient of linear expansion of each of first peripheral internal electrode 40a and second peripheral internal electrode 40b is B, and the coefficient of linear expansion of ceramic layer 14 is C. As a result, the difference in contraction amount during firing between internal electrode layer 16 and ceramic layer 14 is reduced by the metallic species included in peripheral internal electrode 40 which is different from the metallic species of inside internal electrode 42, further reducing a thermal stress during firing. When the relationship A>B>C is not obtained, a difference in contraction amount during firing between internal electrode layer 16 located in peripheral internal electrode 40 and ceramic layer increases, which may lead to the occurrence of peeling or cracking.

Coefficient of linear expansion A of the metallic species of inside internal electrode 42 is preferably, for example, more than or equal to about $9 \times 10^{-6}/°$ C. and less than or equal to about $18 \times 10^{-6}/°$ C., such that coefficient of linear expansion A can be adjusted by changing the metallic species.

Coefficient of linear expansion B of the metallic species of peripheral internal electrode 40 is preferably, for example, more than or equal to about $9 \times 10^{-6}/°$ C. and less than or equal to about $17 \times 10^{-6}/°$ C., such that coefficient of linear expansion B can be adjusted by changing a ratio between the metallic species of inside internal electrode 42 included in peripheral internal electrode 40 and the dissimilar metallic species different from the metallic species of inside internal electrode 42.

Coefficient of linear expansion C of ceramic layer 14 is preferably, for example, more than or equal to about $7 \times 10^{-6}/°$ C. and less than or equal to about $12 \times 10^{-6}/°$ C., such that coefficient of linear expansion C can be adjusted by changing the composition of a material of or an additive to ceramic layer 14.

The thickness of internal electrode layer 16 is preferably more than or equal to about 0.2 μm and less than or equal to about 2.0 μm, for example. Also, although any number of internal electrode layers 16 may be provided, for example, 10 or more and 2000 or less internal electrode layers 16 are preferably provided.

Figure 6A:
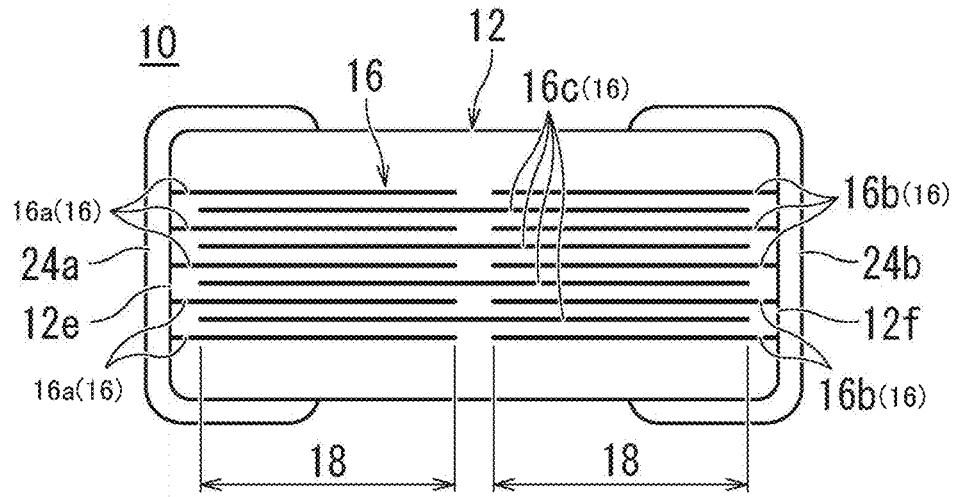
FIG. 6A is a schematic sectional view of a multilayer ceramic electronic component according to a modification of a preferred embodiment of the present invention, which is a schematic sectional view taken along the line II-II of FIG. 1, showing a structure in which a facing electrode portion of an internal electrode layer is divided into two portions.
Figure 6B:
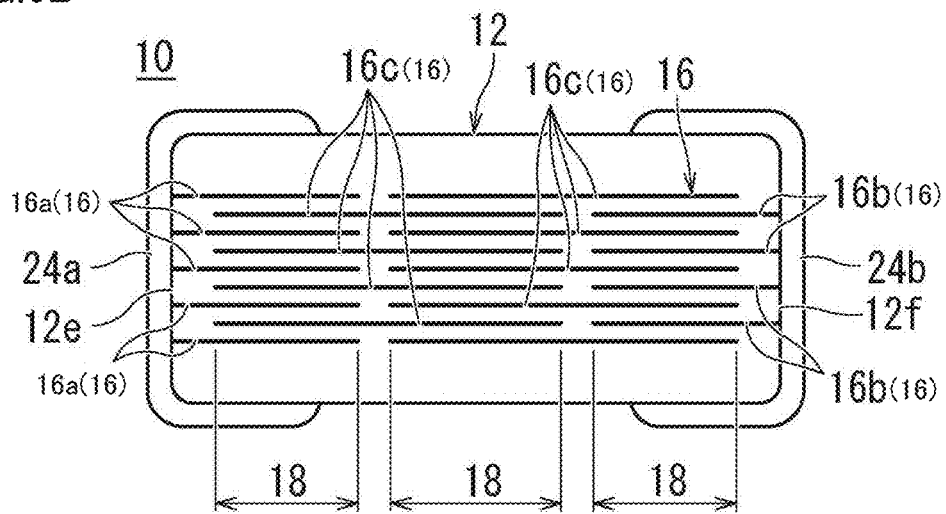
FIG. 6B is a schematic sectional view of a multilayer ceramic electronic component according to a modification of a preferred embodiment of the present invention, which is a schematic sectional view taken along the line II-II of FIG. 1, showing a structure in which a facing electrode portion of an internal electrode layer is divided into three portions.
Figure 6C:
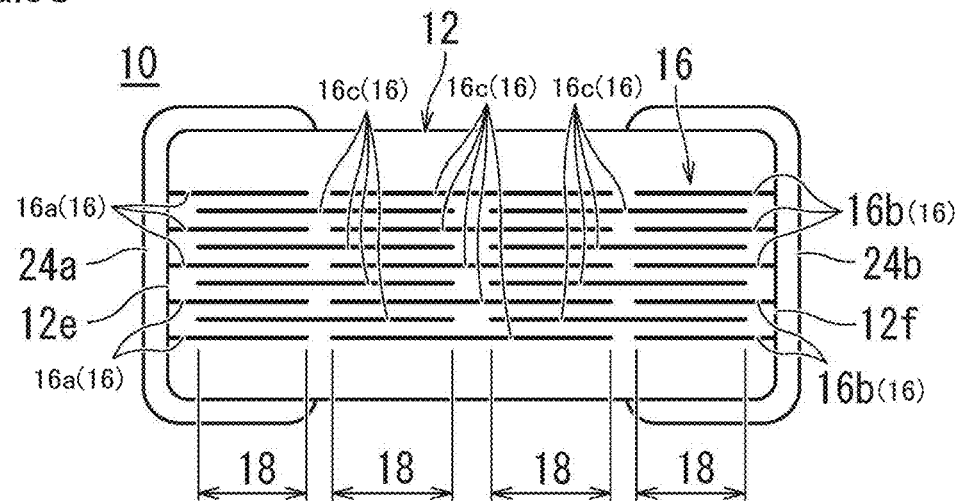
FIG. 6C is a schematic sectional view of a multilayer ceramic electronic component according to a modification of a preferred embodiment of the present invention, which is a schematic sectional view taken along the line II-II of FIG. 1, showing a structure in which a facing electrode portion of an internal electrode layer is divided into four portions.

As shown in FIGS. 6A to 6C, internal electrode layers 16 may include not only first internal electrode layers 16a and second internal electrode layers 16b but also floating internal electrode layers 16c that are led to neither first end surface 12e nor second end face 12f. With floating internal electrode layers 16c, facing electrode portion 18 may be divided into a plurality of portions. For example, facing electrode portion 18 may include two portions as shown in FIG. 6A, three portions as shown in FIG. 6B, or four portions as shown in FIG. 6C. More than four portions are also possible. With such a structure in which facing electrode portion 18 is divided into a plurality of portions, a plurality of capacitor components are provided between internal electrode layers 16a, 16b, and 16c facing each other, with these capacitor components being connected in series. This reduces the voltage applied to each capacitor component, thus allowing multilayer ceramic capacitor 10A to withstand a higher voltage.

(B) External Electrodes

External electrodes 24 are provided on first end surface 12e and second end surface 12f of stack 12. External electrodes 24 include a first external electrode 24a and a second external electrode 24b. Each of first external electrode 24a and second external electrode 24b includes an underlying electrode layer 26 connected to internal electrode layers 16 and a plating layer 28 provided on underlying electrode layer 26.

First external electrode 24a is disposed on first end surface 12e of stack 12 and at least a portion of second main surface 12b that is to be mounted on the mounting surface. Alternatively, first external electrode 24a may extend from first end surface 12e to a portion of each of first main surface 12a, second main surface 12b, first lateral surface 12c, and second lateral surface 12d. First external electrode 24a is electrically connected to first leading electrode portion 20a of first internal electrode layer 16a.

Second external electrode 24b is disposed on second end surface 12f of stack 12 and at least a portion of second main surface 12b that is to be mounted on the mounting surface. Alternatively, second external electrode 24b may extend from second end surface 12f to a portion of each of first main surface 12a, second main surface 12b, first lateral surface 12c, and second lateral surface 12d. Second external electrode 24b is electrically connected to second leading electrode portion 20b of second internal electrode layer 16b.

(a) Underlying Electrode Layers

Underlying electrode layers 26 include a first underlying electrode layer 26a and a second underlying electrode layer 26b.

First underlying electrode layer 26a is disposed on a surface of first end surface 12e of stack 12, and extends from first end surface 12e to cover a portion of each of first main surface 12a, second main surface 12b, first lateral surface 12c, and second lateral surface 12d.

Second underlying electrode layer 26b is disposed on a surface of second end surface 12f of stack 12, and extends from second end surface 12f to cover a portion of each of first main surface 12a, second main surface 12b, first lateral surface 12c, and second lateral surface 12d.

Underlying electrode layer 26 includes at least one selected from a baked layer, a conductive resin layer, or a thin film layer, for example.

First, description will be provided of first underlying electrode layer 26a and second underlying electrode layer 26b each of which includes underlying electrode layer 26 formed of a baked layer.

The baked layer includes a glass component and a metal. The metal of the baked layer includes at least one selected from Cu, Ni, Ag, Pd, Ag—Pd alloy, or Au, for example. The glass of the baked layer includes at least one selected from B, Si, Ba, Mg, Al, or Li, for example. The baked layer may include a plurality of layers. The baked layer is obtained by applying a conductive paste including a glass component and a metal to stack 12 and baking stack 12, and may be obtained by co-firing ceramic layer 14 and internal electrode layer 16 or by firing and then baking ceramic layer 14 and internal electrode layer 16.

The thickness of each of the baked layers at the center or approximate center, in the height direction (x direction), of first underlying electrode layer 26a located on first end surface 12e and second underlying electrode layer 26b located on second end surface 12f is preferably more than or equal to about 10 μm and less than or equal to about 200 μm, for example.

When underlying electrode layer 26 is provided on the surfaces of first main surface 12a, second main surface 12b, first lateral surface 12c, and second lateral surface 12d, the thickness of each of the baked layers located at the center or approximate center, in the length direction (z direction), of first underlying electrode layer 26a and second underlying electrode layer 26b located on the surfaces of first main surface 12a, second main surface 12b, first lateral surface 12c, and second lateral surface 12d is preferably more than or equal to about 10 μm and less than or equal to about 200 μm, for example.

Next, description will be provided of first underlying electrode layer 26a and second underlying electrode layer 26b each of which includes underlying electrode layer 26 defined by a conductive resin layer.

The conductive resin layer may include a plurality of layers.

The conductive resin layer may be disposed on the surface of the baked layer to cover the baked layer or may be disposed directly on the surface of stack 12.

The thickness of each of the conductive resin layers at the center or approximate center, in the height direction (x direction), of first underlying electrode layer 26a located on first end surface 12e and second underlying electrode layer 26b located on second end surface 12f is preferably more than or equal to about 10 μm and less than or equal to about 200 μm, for example.

When underlying electrode layer 26 is located on the surfaces of first main surface 12a, second main surface 12b, first lateral surface 12c, and second lateral surface 12d, the thickness of each of the conductive resin layers located at the center or approximate center, in the length direction (z direction), of first underlying electrode layer 26a and second underlying electrode layer 26b located on the surfaces of first main surface 12a, second main surface 12b, first lateral surface 12c, and second lateral surface 12d is preferably more than or equal to about 5 μm and less than or equal to about 50 μm, for example.

The conductive resin layer includes a thermosetting resin and a metal. The conductive resin layer, which includes the thermosetting resin, is more flexible than, for example, a conductive layer defined by a plating film or a fired layer including a conductive paste. Accordingly, even when a physical impact or an impact resulting from heat cycle is applied to the multilayer ceramic capacitor, the conductive resin layer defines and functions as a buffer layer, thus reducing or preventing a crack in the multilayer ceramic capacitor.

The metal included in the conductive resin layer may be, for example, Ag, Cu, or an alloy thereof. Metal powder coated with Ag may also be used, in which case, for example, Cu or Ni is preferably included as the metal powder. Oxidation-resistant Cu may also be included. In particular, the conductive metal powder including Ag is preferably included as the metal for the conductive resin layer because Ag, which has the lowest specific resistance among the metals, is suitable for an electrode material, and Ag, which is a noble metal, is highly resistant to oxidizing. It should be noted that the metal coated with Ag is included as a metal for the conductive resin layer because an inexpensive metal can be included in a base material while maintaining the above-described characteristics of Ag.

For example, more than or equal to about 35 vol % and less than or equal to about 75 vol % of the metal included in the conductive resin layer is preferably included with respect to the volume of the entire conductive resin.

The metal (electrically conductive filler) included in conductive resin layer may have any suitable shape. The electrically conductive filler may be, for example, a spherical and/or flat electrically conductive filler, and more preferably, a mixture of spherical powder and flat metal powder.

The metal (electrically conductive filler) included in the conductive resin layer may have any average particle diameter. The electrically conductive filler may have an average particle diameter of, for example, about more than or equal to about 0.3 μm and about less than or equal to about 10 μm.

The metal (electrically conductive filler) included in the conductive resin layer is mainly responsible for electrical conductivity of the conductive resin layer. Specifically, an electrical path is provided in the conductive resin layer due to the particles of the electrically conductive filler being in contact with each other.

Examples of the resin of the conductive resin layer include various known thermosetting resins, such as an epoxy resin, a phenol resin, an urethane resin, a silicone resin, or a polyimide resin. In particular, the epoxy resin, which is excellent in heat resistance, moisture resistance, adhesion, and the like, is one of the more preferable resins.

For example, more than or equal to about 25 vol % and less than or equal to about 65 vol % of the conductive resin layer is preferably included with respect to the volume of the entire conductive resin.

Moreover, the conductive resin layer preferably includes a thermosetting resin, as well as a curing agent. When the epoxy resin is included as a base resin, examples of the curing agent of the epoxy resin include various known compounds, such as a phenol-based curing agent, an amine-based curing agent, an acid anhydride-based curing agent, and an imidazole-based curing agent.

Moreover, when underlying electrode layer 26 is a thin film layer, the thin film layer is formed by a thin film forming method, such as sputtering or vapor deposition, for example. The thin film layer is a layer of less than or equal to about 1 μm with the metal particles being deposited therein.

(b) Plating Layers

Plating layers 28 include a first plating layer 28a and a second plating layer 28b.

First plating layer 28a covers the surface of first underlying electrode layer 26a. Second plating layer 28b covers the surface of second underlying electrode layer 26b.

The metallic material of each of first plating layer 28a and second plating layer 28b preferably includes at least one selected from Cu, Ni, Ag, Pd, Ag—Pd alloy, or Au, for example.

Each of first plating layer 28a and second plating layer 28b may include a plurality of layers. First plating layer 28a preferably has a two-layer structure including a Ni plating layer and a Sn plating layer, for example. Second plating layer 28b also preferably has a two-layer structure of a Ni plating layer and a Sn plating layer, for example. The Ni plating layer can prevent underlying electrode layer 26 from being eroded by a solder used for mounting when multilayer ceramic capacitor 10 is mounted. The Sn plating layer can improve wettability of the solder in mounting of multilayer ceramic capacitor 10, thus facilitating mounting of multilayer ceramic capacitor 10. Each plating layer 28 preferably has a thickness of more than or equal to about 2 μm and less than or equal to about 15 μm, for example.

External electrode 24 may include plating layer 28 alone without underlying electrode layer 26. In this case, plating layer 28 preferably includes no glass. A ratio of metal per unit volume of plating layer 28 is preferably more than or equal to about 99 vol %, for example. Plating layer 28 is provided directly on the surface of stack 12 without underlying electrode layer 26. In other words, multilayer ceramic capacitor 10 includes first plating layer 28a electrically and directly connected to first internal electrode layer 16a exposed to a first end surface 12e of stack 12 and second plating layer 28b electrically and directly connected to second internal electrode layer 16b exposed to a second end surface 12f of stack 12. In such a case, plating layer 28 may be formed after placing a catalyst on the surface of stack 12 in a pre-process.

Plating layer 28 preferably has a two-layer structure including a lower plating electrode provided on the surface of stack 12 and an upper plating electrode provided on a surface of the lower plating electrode.

Each of the lower plating electrode and the upper plating electrode preferably includes at least one metal selected from Cu, Ni, Sn, Pb, Au, Ag, Pd, Bi, or Zn, or an alloy including the metal(s), for example.

The lower plating electrode is preferably made of Ni, for example, which defines and functions as a barrier to a solder in mounting, when multilayer ceramic capacitor 10 is mounted. The upper plating electrode is preferably made of Sn or Au, for example, having excellent solder wettability when multilayer ceramic capacitor 10 is mounted.

Moreover, for example, when first internal electrode layer 16a and second internal electrode layer 16b are made of Ni, the lower plating electrode is preferably made of Cu having excellent bondability with Ni. It should be noted that the upper plating electrode may be provided as appropriate. Each of first external electrode 24a and second external electrode 24b may include the lower plating electrode alone.

Plating layer 28 may include the upper plating electrode as its outermost layer or may additionally include another plating electrode provided on the surface of the upper plating electrode.

The thickness of each plating layer 28 disposed without underlying electrode layer 26 is preferably more than or equal to about 1 μm and less than or equal to about 15 μm, for example.

Preferably, an L dimension, in length direction z, of multilayer ceramic capacitor 10 including stack 12 and two external electrodes 24 is more than or equal to about 0.2 mm and less than or equal to about 10 mm, a T dimension, in stacking direction x, of multilayer ceramic capacitor 10 is more than or equal to about 0.1 mm and less than or equal to about 5 mm, and a W dimension, in width direction y, of multilayer ceramic capacitor 10 is more than or equal to about 0.1 mm and less than or equal to about 10 mm, for example.

2. Method of Manufacturing Multilayer Ceramic Electronic Component

Next, a method of manufacturing multilayer ceramic capacitor 10 according to a preferred embodiment of the present invention will be described.

First, a dielectric sheet and a conductive paste for an internal electrode layer are prepared. A binder and a solvent are included in each of the dielectric sheet and the conductive paste for an internal electrode layer. A known organic binder and an organic solvent can be used.

As the conductive paste for an internal electrode layer, a conductive paste A, including one metallic species, and a conductive paste B, including the metallic species of conductive paste A and more than or equal to about 50% of a dissimilar metal species, are prepared. Herein, conductive paste A is a conductive paste for a portion of first internal electrode 16a which turns into first inside internal electrode portion 42a and a conductive paste for a portion of second internal electrode 16b which turns into second inside internal electrode 42b. Conductive paste B is a conductive paste for a portion of first internal electrode 16a which turns into first inside internal electrode portion 42a and a conductive paste for a portion of second internal electrode 16b which turns into second inside internal electrode 42b.

Subsequently, conductive paste A for an internal electrode layer is printed on the dielectric sheet in a predetermined printing pattern by, for example, inkjet printing or two-color gravure printing to form a pattern of first inside internal electrode portion 42a of first internal electrode 16a or a pattern of second inside internal electrode 42b of second internal electrode 16b.

Subsequently, conductive paste B for an internal electrode layer is printed in another predetermined printing pattern to form a pattern of first peripheral internal electrode 40a of first internal electrode 16a or a pattern of second peripheral internal electrode 40b of second internal electrode 16b in a peripheral portion of conductive paste A.

The metallic species and coefficients of linear expansion of conductive paste A and conductive paste B are controlled in accordance with the compositions of conductive paste A and conductive paste B used. The widths and shapes of peripheral internal electrode 40 and inside internal electrode 42 of internal electrode 16 are controlled in accordance with the printing pattern.

A stacked sheet is produced by stacking a predetermined number of dielectric sheets for external layers each including no printed internal electrode layer pattern, successively stacking dielectric sheets each having a printed internal electrode layer pattern, and thereon, stacking a predetermined number of dielectric sheets for external layers.

The stacked sheets are pressed in stacking direction x by, for example, isostatic pressing or the like, thus producing a stacked block.

Subsequently, the stacked block is cut into a predetermined shape and size, thus cutting out a raw stacked chip. Barrel polishing or the like may be performed on the raw stacked chip to round corners and ridgelines of stack 12.

Subsequently, the stacked chip is fired, thus producing stack 12. The temperature of firing is preferably, for example, more than or equal to about 900° C. and less than or equal to about 1400° C., depending on the materials of ceramic layer 14 and internal electrode layer 16.

Finally, the conductive paste that turns into underlying electrode layer 26 of external electrode 24 is applied to the opposite end surfaces of stack 12, thus forming underlying electrode layer 26. In the present preferred embodiment, a baked layer is formed as underlying electrode layer 26. When the baked layer is formed, a conductive paste including a glass component and metal is applied by a method, for example, dipping, and baking is then performed, thus forming underlying electrode layer 26. The temperature of baking is preferably, for example, more than or equal to about 700° C. and less than or equal to about 900° C. The surface of the baked layer may be plated as appropriate.

It should be noted that when underlying electrode layer 26 is formed of the conductive resin layer, the conductive resin layer can be formed by the following method. It should be noted that the conductive resin layer may be formed on the surface of the baked layer, or the conductive resin layer may be solely formed directly on stack 12 without forming the baked layer.

As a method of forming the conductive resin layer, the conductive resin layer is formed by applying a conductive resin paste including a thermosetting resin and a metal component onto the baked layer or stack 12, and performing heat treatment at a temperature of, for example, more than or equal to about 250° C. and less than or equal to about 550° C. to thermally cure the resin. An atmosphere during the heat treatment is preferably a $N_2$ atmosphere, for example. In order to prevent scattering of the resin and also prevent oxidation of various metal components, an oxygen concentration is preferably reduced to less than or equal to about 100 ppm, for example.

When underlying electrode layer 26 is formed of a thin film layer, the underlying electrode layer can be formed by a thin film forming method, such as sputtering or vapor deposition, for example. The underlying electrode layer formed of the thin film layer is a layer of less than or equal to about 1 μm, for example, with the metal particles being deposited therein.

No underlying electrode layer 26 may be provided, and plating layer 28 may be provided on the exposed portion of internal electrode layer 16 of stack 12. In this formation, the following method can be used.

First end surface 12e and second end surface 12f of stack 12 are plated to form an underlying plating film on the exposed portion of internal electrode layer 16. Although either of electrolytic plating or non-electrolytic plating may be used in plating, non-electrolytic plating requires a pre-process using a catalyst or the like for an improved plating deposition rate, leading to complicated steps. Thus, electrolytic plating is normally and preferably used. Barrel plating is preferably used as the plating method. The upper plating electrode may be formed on the surface of the lower plating electrode in the same or similar manner as appropriate.

Subsequently, plating layer 28 is formed on the surface of underlying electrode layer 26, the surface of the conductive resin layer or the surface of the underlying plating layer, and the surface of the upper plating layer. In the present preferred embodiment, a Ni plating layer and a Sn plating layer are formed on the baked layer. The Ni plating layer and the Sn plating layer are successively formed by, for example, barrel plating. Consequently, multilayer ceramic capacitor 10 is obtained.

3. Experimental Examples (A) Influence of Composition of Internal Electrode Layer, and Influences of Length a and Length b In accordance with the manufacturing method described above, 100 multilayer ceramic capacitors were produced as multilayer ceramic electronic components for each of samples No. 1 to No. 12 shown in Table 1. Subsequently, a crack occurrence ratio and an equivalent series resistance (ESR) were measured to examine the influence of the composition of the internal electrode layer and the influences of dimension a and dimension b.

Figure 7:
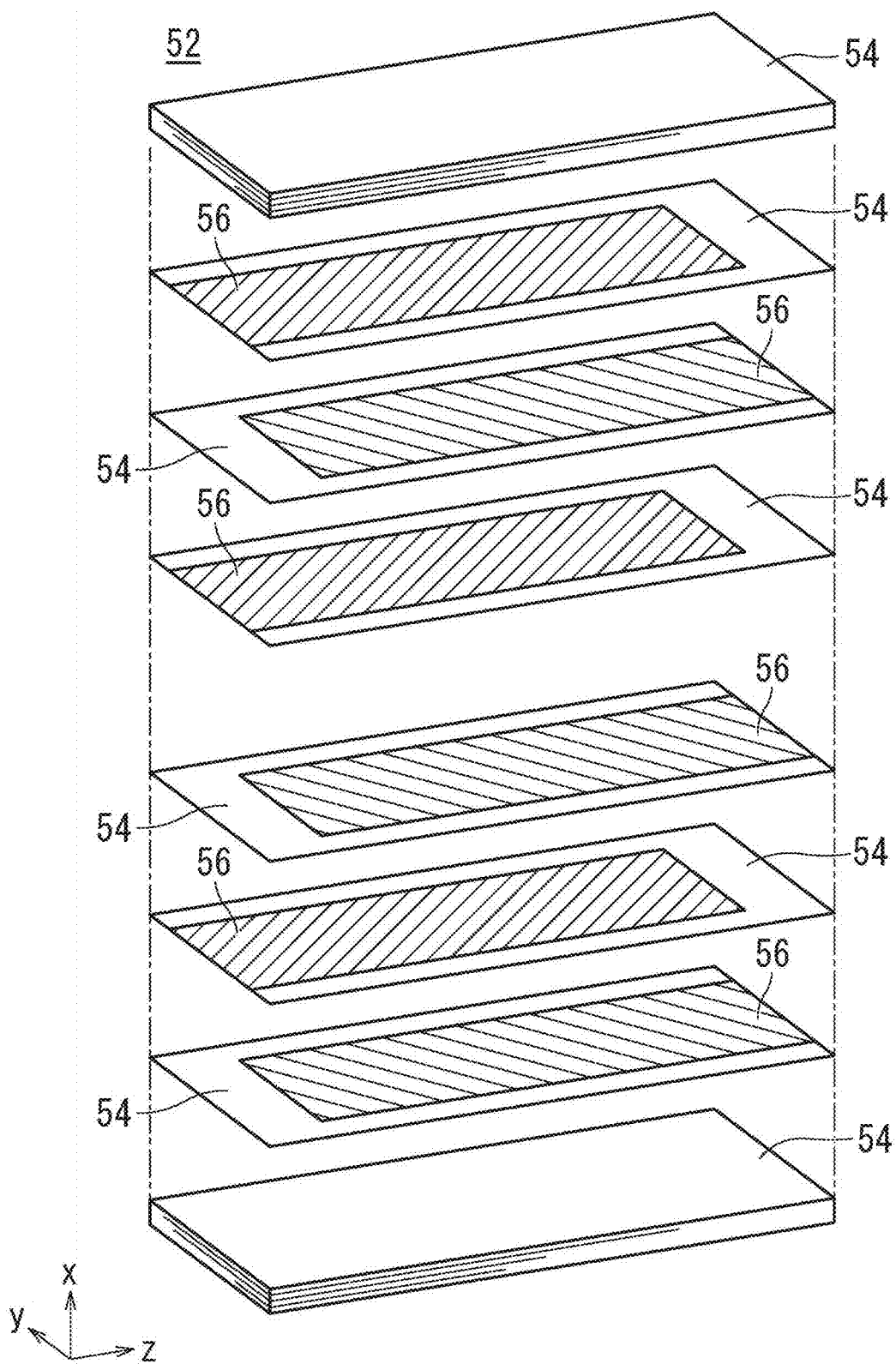
FIG. 7 is an assembly perspective view of a stack of a conventional example.
Figure 8:
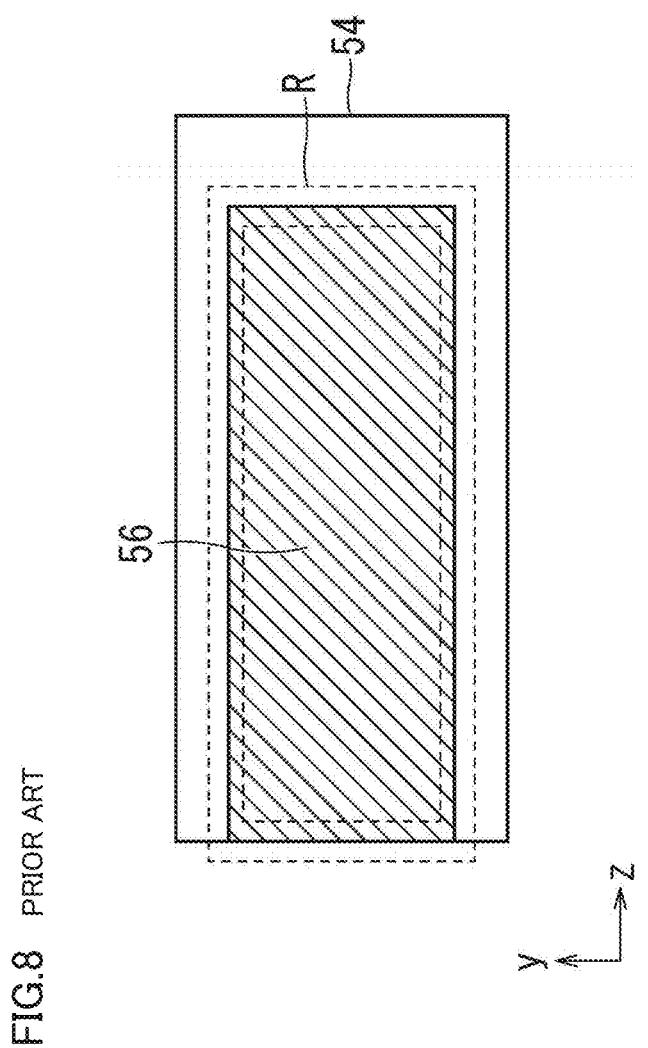
FIG. 8 is a schematic plan view for illustrating a problem of an internal electrode of the conventional example.

Sample No. 1 is a capacitor including a conventional internal electrode layer 56 shown in FIG. 7.

Samples No. 2 to No. 7 are capacitors in which the metallic species included in inside internal electrode 42 is different from the metallic species included in peripheral internal electrode 40 in order to examine the influence of the composition of internal electrode layer 16 of the present invention.

Samples No. 8 to No. 12 are capacitors in which dimension a of the width of peripheral internal electrode 40 is different from dimension b of the width of inside internal electrode 42 in internal electrode layer 16 of the present invention in order to examine the influences of dimension a and dimension b.

In order to clarity the advantageous effects of the present invention, an atmosphere of firing and a timing of contraction of an electrode were changed from those of normal firing conditions, and acceleration evaluation was performed on the firing conditions on which cracks would easily occur in all the samples.

Specifications of multilayer ceramic capacitors of samples No. 1 to No. 12 are as follows.
Size L×W×T (designed value): about 1.6 mm×about 0.8 mm×about 0.8 mm
Ceramic material: $CaZrO_3$ (a) Method of Calculating Crack Occurrence Ratio For the produced multilayer ceramic capacitor, its appearance was visually checked under a metallographic microscope, the presence or absence of occurrence of cracks was checked, and a crack occurrence ratio was calculated.

(b) Method of Measuring Equivalent Series Resistance (ESR)

The multilayer ceramic capacitor was mounted on a measurement substrate using a solder, a measurement frequency was set to about 1 MHz, and an ESR was measured with a network analyzer. An ESR measured value is an average value obtained by arbitrarily extracting five samples from 100 samples and measuring the values of the five samples.

(c) Method of Measuring Dimension a and Dimension b

The multilayer ceramic capacitor was hardened with a resin and was polished to be perpendicular or substantially perpendicular to first main surface 12a and second main surface 12b or first lateral surface 12c and second lateral surface 12d in the first end surface 12e direction or the second end surface 12f direction, thus exposing a cross section (WT cross section). Herein, polishing was performed to a position with about a half of the L dimension in length direction z connecting first end surface 12e and second end surface 12f. Subsequently, the composition of the polished cross section was analyzed by energy dispersive X-ray analysis (EDX) to measure dimension a and dimension b of first internal electrode layer 16a or second internal electrode layer 16b at a position with about a half of T dimension in thickness direction x connecting the first main surface and the second main surface while checking differences in composition. Each of the measured values of dimension a and dimension b is an average value obtained by arbitrarily extracting five samples from 100 samples and measuring the values of the five samples.

Table 1 shows the crack occurrence ratios and the ESR measurement results according to the influence of the composition of the internal electrode layer of the multilayer ceramic capacitor and the influences of dimension a and dimension b described above.

In samples No. 2 to No. 4 of Table 1, the following was found. Since a metallic species for peripheral internal electrode 40 of internal electrode layer 16 included more than or equal to about 50% of a metallic species Fe different from a metallic species Ni for inside internal electrode 42, a difference in contraction during firing of the raw stacked chip was reduced, and accordingly, the occurrence of cracks was reduced.

On the other hand, in samples No. 5 and No. 6, the following was found. Since the metallic species for peripheral internal electrode 40 of internal electrode layer 16 included only less than about 50% of the metallic species Fe different from the metallic species Ni for inside internal electrode 42, a difference in contraction during firing of the raw stacked chip was not reduced, and accordingly, the occurrence of cracks was not reduced.

Moreover, also in sample No. 7 (a sample in which the compositions of the metallic species of peripheral internal electrode 40 and inside internal electrode 42 of internal electrode layer 16 are opposite to those off sample No. 4), since the metallic species Ni for peripheral internal electrode 40 of internal electrode layer 16 included no metallic species different from any one of the metallic species Ni and Fe for inside internal electrode 42, a difference in contraction during firing of the raw stacked chip was not reduced, and accordingly, the crack occurrence ratio after firing did not decrease.

Also, as shown in sample No. 8, since dimension a of the width of peripheral internal electrode 40 of internal electrode layer 16b was about 5 μm<a, when the region of peripheral internal electrode 40 was excessively small, a difference in contraction during firing of the raw stacked chip was not reduced, and accordingly, the crack occurrence ratio after firing did not decrease.

Further, as shown in samples No. 9 to No. 12, when dimension a of the width of peripheral internal electrode 40 and dimension b of the width of inside internal electrode 42 of internal electrode layer 16 had a relational expression a>about 30 μm and a relational expression b/a<about 20, the ESR was poor due to a high electrical resistance of peripheral internal electrode 40.

The above results shown that if a relational expression about 5 μm<a<about 30 μm and a relational expression b/a about 20 are satisfied, cracks can be reduced or prevented, and the ESR value can be reduced.

(B) Influence of Coefficient of Linear Expansion

In accordance with the manufacturing method described above, 100 multilayer ceramic capacitors were produced for each of samples No. 13 to No. 15 shown in Table 2.

TABLE 1

| SAMPLE No. | COMPOSITION OF INSIDE INTERNAL ELECTRODE | COMPOSITION OF PERIPHERAL INTERNAL ELECTRODE | a (μm) | b (μm) | b/a | CRACK OCCURRENCE RATIO (%) | E S R (AT 20 MHz) (mΩ) |
|---|---|---|---|---|---|---|---|
| 1 | Ni | — | — | 450 | | 60 | 10.4 |
| 2 | Ni | Fe | 6 | 450 | 75 | 13 | 10.1 |
| 3 | Ni | 10% Ni + 90% Fe | 6 | 450 | 75 | 10 | 11.4 |
| 4 | Ni | 50% Ni + 50% Fe | 6 | 450 | 75 | 15 | 12.1 |
| 5 | Ni | 70% Ni + 30% Fe | 6 | 450 | 75 | 60 | 10.6 |
| 6 | Ni | 90% Ni + 10% Fe | 6 | 450 | 75 | 62 | 11.2 |
| 7 | 50% Ni + 50% Fe | Ni | 6 | 450 | 75 | 85 | 46.1 |
| 8 | Ni | 50% Ni + 50% Fe | 4 | 600 | 150 | 55 | 12.1 |
| 9 | Ni | 50% Ni + 50% Fe | 15 | 600 | 40 | 12 | 12.5 |
| 10 | Ni | 50% Ni + 50% Fe | 20 | 600 | 30 | 20 | 11.1 |
| 11 | Ni | 50% Ni + 50% Fe | 30 | 600 | 20 | 12 | 30.0 |
| 12 | Ni | 50% Ni + 50% Fe | 25 | 450 | 18 | 18 | 33.5 |

Subsequently, the crack occurrence ratio was calculated to examine the influence of a coefficient of linear expansion.

Sample No. 13 is a capacitor including a conventional internal electrode layer 56 shown in FIG. 7.

Sample No. 14 is a capacitor in which coefficient of linear expansion A of the metallic species Ni of inside internal electrode 42 is about $13.3 \times 10^{-6}/°$ C., coefficient of linear expansion B of a metallic species Ni+Pd of peripheral internal electrode 40 is about $12.0 \times 10^{-6}/°$ C., coefficient of linear expansion C of $BaTiO_3$ of ceramic layer 14 is about $8.2 \times 10^{-6}/°$ C., and a relationship A>B>C is provided.

In sample No. 15 (a sample in which the compositions of the metallic species of peripheral internal electrode 40 and inside internal electrode 42 of internal electrode layer 16 are opposite to those of sample No. 14), coefficient of linear expansion A of the metallic species Ni+Pd of inside internal electrode 42 is about $12.0 \times 10^{-6}/°$ C., coefficient of linear expansion B of the metallic species Ni of peripheral internal electrode 40 is about $13.3 \times 10^{-6}/°$ C., coefficient of linear expansion C of $BaTiO_3$ of ceramic layer 14 is about $8.2 \times 10^{-6}/°$ C., and a relationship B>A>C is provided.

The specifications of the multilayer ceramic capacitors of samples No. 13 to No. 15 are as follows.

Size L×W×T (designed value): about 1.5 mm×about 0.6 mm×about 0.6 mm

Ceramic material: $CaZrO_3$

Table 2 shows the measurement results of the crack occurrence ratios of the above multilayer ceramic capacitors.

TABLE 2

| SAMPLE No. | INSIDE INTERNAL ELECTRODE | | PERIPHERAL INTERNAL ELECTRODE | | | | | CRACK OCCURRENCE RATIO (%) |
|---|---|---|---|---|---|---|---|---|
| | COMPOSITION | COEFFICIENT OF LINEAR EXPANSION ($\times 10^{-6}/°$ C.) | COMPOSITION | COEFFICIENT OF LINEAR EXPANSION ($\times 10^{-6}/°$ C.) | a (μm) | b (μm) | b/a | |
| 13 | Ni | 13.3 | — | — | — | 450 | — | 60 |
| 14 | Ni | 13.3 | 10% Ni + 90% Pd | 12.0 | 6 | 450 | 75 | 0 |
| 15 | 10% Ni + 90% Pd | 12.0 | Ni | 13.3 | 6 | 450 | 75 | 84 |

In sample No. 14 of Table 2, the following was found. When the coefficient of linear expansion had the relationship A>B>C, a difference in contraction during firing of the raw stacked chip was reduced, and no cracks occurred.

On the other hand, in sample No. 15, the following was found. Since the coefficient of linear expansion had the relationship B>A>C, a difference in contraction during firing of the raw stacked chip was not reduced, and the crack occurrence ratio did not decrease.

The above results show that the advantageous effects of the present invention are achieved by providing the following relationship: coefficient of linear expansion A of the inside internal electrode>coefficient of linear expansion B of the peripheral internal electrode>coefficient of linear expansion C of the ceramic layer.

Although preferred embodiments of the present invention have been disclosed above, the present invention is not limited to the above-described preferred embodiments.

The preferred embodiments described above may be modified in various manners in mechanism, shape, material, quantity, position, layout and the like, without departing from the scope of the technical idea and purpose of the present invention. All of such modifications are included in the present invention.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:
a stack including a plurality of ceramic layers that are stacked and a plurality of internal electrode layers that are stacked on the plurality of ceramic layers, the stack including a first main surface and a second main surface facing each other in a stacking direction, a first end surface and a second end surface facing each other in a length direction orthogonal or substantially orthogonal to the stacking direction, and a first lateral surface and a second lateral surface facing each other in a width direction orthogonal or substantially orthogonal to the stacking direction and the length direction, each of the plurality of internal electrode layers includes a first internal electrode layer exposed to the first end surface and a second internal electrode layer exposed to the second end surface;
a first external electrode connected to the first internal electrode layer, disposed on the first end surface, and extending from the first end surface to cover a portion of each of the first main surface, the second main surface, the first lateral surface, and the second lateral surface; and
a second external electrode connected to the second internal electrode layer, disposed on the second end surface, and extending from the second end surface to cover a portion of each of the first main surface, the second main surface, the first lateral surface, and the second lateral surface; wherein
the first internal electrode layer includes, on a same ceramic layer of the plurality of ceramic layers, a first peripheral internal electrode having a frame shape and a first inside internal electrode located inside the first peripheral internal electrode;
the second internal electrode layer includes, on a same ceramic layer of the plurality of ceramic layers, a second peripheral internal electrode having a frame shape and a second inside internal electrode located inside the second peripheral internal electrode;
a metallic species included in each of the first peripheral internal electrode and the second peripheral internal electrode is different from a metallic species included in each of the first inside internal electrode and the second inside internal electrode;
the metallic species included in each of the first peripheral internal electrode and the second peripheral internal electrode includes more than or equal to about 50% of a metallic species different from the metallic species included in each of the first inside internal electrode and the second inside internal electrode; and in a width direction connecting the first lateral surface and the second lateral surface, about 5 μm<a1 where at least one of a dimension of a width of the first peripheral internal electrode closest to the first lateral surface and a dimension of a width of the first peripheral internal electrode closest to the second lateral surface is a1, and about 5 μm<a2 where at least one of a dimension of a width of the second peripheral internal electrode closest to the first lateral surface and a dimension of a width of the second peripheral internal electrode closest to the second lateral surface is a2.

2. The multilayer ceramic electronic component according to claim 1, wherein in the width direction connecting the first lateral surface and the second lateral surface, a1<about 30 μm and b1/a1≥about 20 where a dimension of a width of the first inside internal electrode is b1, and a2<about 30 μm and b2/a2≥about 20 where a dimension of a width of the second inside internal electrode is b2.

3. The multilayer ceramic electronic component according to claim 1, wherein A>B>C where a coefficient of linear expansion of each of the first inside internal electrode and the second inside internal electrode is A, a coefficient of linear expansion of each of the first peripheral internal electrode and the second peripheral internal electrode is B, and a coefficient of linear expansion of the ceramic layer is C.

4. The multilayer ceramic electronic component according to claim 1, wherein a dimension of the stack in the length direction is more than or equal to about 0.2 mm and less than or equal to about 5.5 mm, a dimension of the stack in the width direction is more than or equal to about 0.1 mm and less than or equal to about 2.5 mm, and a dimension of the stack in the stacking direction is more than or equal to about 0.1 mm and less than or equal to about 2.5 mm.

5. The multilayer ceramic electronic component according to claim 1, wherein the plurality of ceramic layers include more than or equal to 10 ceramic layers and less than or equal to 2000 ceramic layers.

6. The multilayer ceramic electronic component according to claim 1, wherein each of the plurality of ceramic layers includes $BaTiO_3$, $CaTiO_3$, $SrTiO_3$, or $CaZrO_3$.

7. The multilayer ceramic electronic component according to claim 6, wherein each of the plurality of ceramic layers further includes a Mn compound, an Fe compound, a Cr compound, a Co compound, or a Ni compound as an accessory component.

8. The multilayer ceramic electronic component according to claim 1, wherein the metallic species included in each of the first and second peripheral electrodes includes at least one of Ni, Cu, Ag, Pd, or Au, or an alloy including at least one of Ni, Cu, Ag, Pd, or Au.

9. The multilayer ceramic electronic component according to claim 8, wherein the metallic species included in each of the first and second peripheral electrodes includes Ni.

10. The multilayer ceramic electronic component according to claim 1, wherein the metallic species included in each of the first and second inside internal electrodes includes at least one of Ni, Cu, Ag, Pd, or Au, or an alloy including at least one of Ni, Cu, Ag, Pd, or Au.

11. The multilayer ceramic electronic component according to claim 10, wherein the metallic species included in each of the first and second inside internal electrodes includes Pd.

12. The multilayer ceramic electronic component according to claim 3, wherein the coefficient of linear expansion of each of the first and second inside internal electrodes is more than or equal to about $9 \times 10^{-6}/°$ C. and less than or equal to about $18 \times 10^{-6}/°$ C.

13. The multilayer ceramic electronic component according to claim 3, wherein the coefficient of linear expansion of each of the first and second peripheral internal electrodes is more than or equal to about $9 \times 10^{-6}/°$ C. and less than or equal to about $17 \times 10^{-6}/°$ C.

14. The multilayer ceramic electronic component according to claim 3, wherein the coefficient of linear expansion of each of the plurality of ceramic layer is more than or equal to about $7 \times 10^{-6}/°$ C. and less than or equal to about $12 \times 10^{-6}/°$ C.

15. The multilayer ceramic electronic component according to claim 1, wherein
the first external electrode includes a first underlying electrode layer connected to the first internal electrode layer and a first plating layer provided on the first underlying electrode layer; and
the second external electrode includes a second underlying electrode layer connected to the second internal electrode layer and a second plating layer provided on the second underlying electrode layer.

16. The multilayer ceramic electronic component according to claim 15, wherein each of the first and second underlying electrode layers includes at least one of a baked layer, a conductive resin layer, and a thin film layer.

17. The multilayer ceramic electronic component according to claim 16, wherein each of the first and second underlying electrode layers includes a baked layer including a glass component and a metal.

18. The multilayer ceramic electronic component according to claim 17, wherein the metal includes at least one of Cu, Ni, Ag, Pd, Ag—Pd alloy, or Au.

19. The multilayer ceramic electronic component according to claim 17, wherein the glass includes at least one of B, Si, Ba, Mg, Al, or Li.

20. The multilayer ceramic electronic component according to claim 15, wherein each of the first and second plating layers includes a Ni plating layer and a Sn plating layer.

* * * * *